Oct. 11, 1932.  W. B. MEGLITZ  1,881,812
APPARATUS FOR TESTING SHEET MATERIAL
Filed Aug. 11, 1930
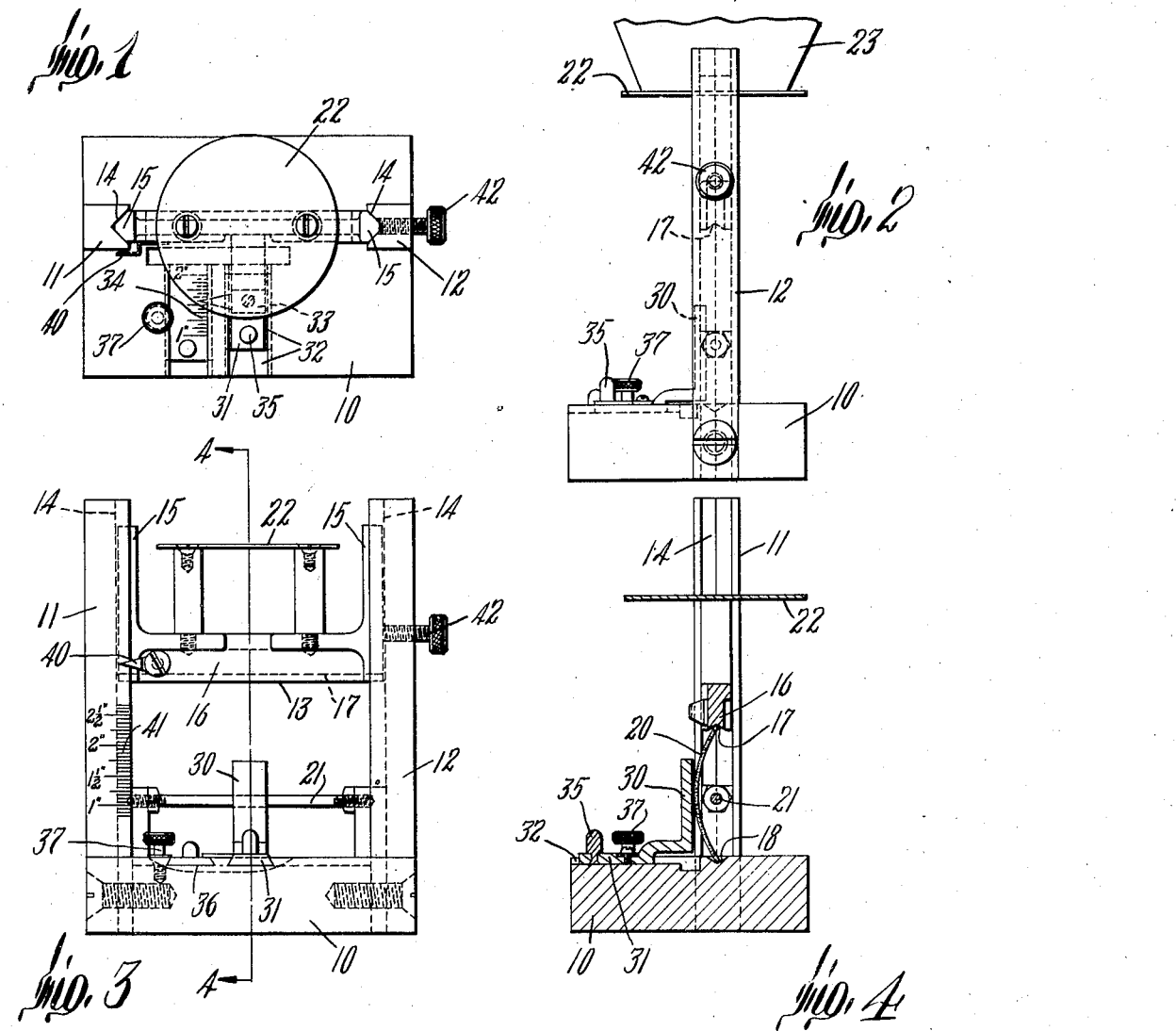

Patented Oct. 11, 1932

1,881,812

UNITED STATES PATENT OFFICE

WILLIAM B. MEGLITZ, OF BERLIN, NEW HAMPSHIRE, ASSIGNOR TO BROWN COMPANY, OF BERLIN, NEW HAMPSHIRE, A CORPORATION OF MAINE

APPARATUS FOR TESTING SHEET MATERIAL

Application filed August 11, 1930. Serial No. 474,390.

This invention relates to a method of and apparatus for testing the resistance of sheet material to bending under compressional stresses applied to the edges of a sample of given size. While the invention is applicable to samples of flexible sheet material in general, it is designed more especially for applying tests to determine the quality of a certain kind of artificial leather which can be made by impregnating a web of loosely felted fluffy fibrous material with latex and coagulating the rubber from the latex so that it is distributed through the body of the sheet with substantial uniformity. Due to various causes, including the tendency of the rubber particles to migrate toward the surface of the sheet as the latex therein is dried, the uniformity of distribution of rubber throughout the sheet cannot always be depended upon. In order to maintain a substantial uniformity of quality in the product, it is necessary to make frequent tests from samples taken at intervals. The quality of the sheet, which depends largely on the distribution of its rubber content, can be sufficiently determined in some respects by its resistance to bending under compressional stresses applied to the edges of a sample of given size.

Artificial leather of the type described is moderately stiff but is capable of being bent through a considerable angle without fracture. If a sample of given size and preferably of rectangular shape is tested by applying compressional stresses to opposite edges, the sample will bow increasingly as the compression is increased so that the amount of pressure required to produce bowing of a sample of standard size may be taken as a measure of the quality of the material in the test sample. Instead of or in addition to measuring the force required to produce a lateral displacement of the center of the sample through a given distance from the plane of the two ends, the distance of approach of the two edges to which pressure is applied may also be observed as a measure of the quality of the material.

For facilitating the testing of samples of a sheet of artificial leather or the like I have provided an apparatus by which the amount of force necessary to produce a given lateral displacement of the central portion of the sample may be readily measured, also the amount of force required to push the opposite edges of a sample toward each other through a given distance.

For a more complete understanding of the invention, reference may be had to the description thereof which follows and to the drawing, of which, Figure 1 is a plan view of a device embodying the invention.

Figure 2 is a side elevation of the same.

Figure 3 is a front elevation of the same.

Figure 4 is a section on the line 4—4 of Figure 3.

The device may include a suitable base or platform 10 from the opposite sides of which rise a pair of standards or rails 11 and 12. Between these standards a carriage 13 is slidably supported and is guided by the standards. To this end any suitable guiding elements may be employed. As shown the standards 11 and 12 are grooved as at 14 to receive sliding elements 15 which are a part of the carriage 13. The slides 15 of the carriage are joined by a cross bar 16 which is grooved as at 17 on its under surface, this groove extending substantially from one end of the bar to the other. Directly below the groove 17 and opposed thereto is a similar groove 18 in the upper face of the platform 10. These grooves are adapted to receive the edges of a sample 20 of sheet material to be tested. In order to ensure the bulging or bending of the test sample in the correct direction from the plane of its edges, I may mount a cross rod 21 between the standards 11 and 12 a short distance above the groove 18. This cross rod 21 is preferably located in a common plane with the grooves 17 and 18 so that when the edges of a sample are inserted in the grooves, the mid portion thereof must be out of line with the grooves.

Compressive stresses are applied to the sample under test by first inserting the sample with its edges in the grooves 17 and 18 and then placing weights of increasing magnitude on the carriage 13. These may be placed on a convenient platform 22 supported on the carriage and may be of any convenient form such as fine lead shot which can be poured into a suitable open receptacle 23 on the platform 22 until the desired distortion of the sample is attained. As weight is added to the carriage 13 the bending of the sample increases, there being a distinct bend or bulge corresponding to the weight applied to the carriage.

In using the device, the sample is inserted therein with its upper and lower edges in the grooves 17 and 18. As the weight on the carriage 13 is increased, the distortion of the sample is constantly observed, this distortion including the amount of lateral bulge of the mid portion of the sheet from the plane of the upper and lower edges of the sample, and the movement of the opposite edges of the sheet toward each other under the pressure of the weight on the carriage 13. In order to determine the amount of bulge, I may provide an upright feeler 30 which is supported by a slide 31 fitted in a dovetail groove 32 in the upper face of the platform 10. A suitable index 33 is mounted on the slide 31 to move over a scale 34 mounted on the upper face of the platform and thus to indicate the amount of bulge. A finger piece 35 may be mounted on the slide 31 to facilitate the manipulation thereof when it is desired to push the feeler inwardly against the surface of a sample to be tested. The scale member 34 is preferably formed of a slide which slides in a dovetail groove 36 in the upper face of the platform 10. A set screw 37 is provided to hold the scale member 34 adjustably in place. This scale member can be readily adjusted for testing sheets of different thickness by loosening the set screw 37 to permit adjusting movement of the member 34.

The distance of the movement of the edges of the sample toward each other may be indicated by an index 40 mounted on a convenient portion of the carriage 13 and adapted to cooperate with a number of scale divisions 41 which may be upon one of the standards 11 or 12. A set screw 42 with a knurled head for convenient manipulation may be threaded through the standard 12 so as to bring its inner end into binding contact with one of the slides 15 of the carriage. Thus a slight turn of the screw 42 with the fingers ordinarily holds the carriage in the elevated position shown in Figure 3. This permits the free use of both hands to arrange the sample in position for testing. When the carriage is lowered so that its groove 17 receives the upper edge of the sample, the feeler 30 may then be moved forwardly into contact with the bulging face of the sample. Then increasing weight is applied to the carriage platform 22 until the feeler is pushed outwardly to a given point on the scale 34, or until the index 40 in its descent reaches a desired division of the scale 41. When either or both index members have reached the desired point on the scale, the further addition of weight to the platform 22 ceases and the accumulated weight thereon is determined. The amount of weight required to produce a given distortion of a sample depends upon the nature of the sample, that is the distribution of rubber through the body of the sheet.

By making frequent tests with applicant's device, the quality of the artificial leather product can be maintained substantially uniform since a change in the quality of the product is at once reflected in its resistance to bend against the application of compressional stresses.

I claim:

1. A device of the class described comprising a platform, a pair of vertical rails rising therefrom, a carriage slidable up and down between said rails, said platform and carriage having a pair of opposing grooves, one over the other, to receive opposite edges of a piece of sheet material to be tested, and an upstanding feeler horizontally slidable on said platform toward and from the plane of said grooves.

2. A device of the class described comprising a platform having a groove therein to receive an edge of a piece of sheet material to be tested, a carriage having an opposing groove above and parallel to the first groove, means for guiding said carriage for vertical sliding movement, means for indicating the altitude of the carriage above the platform, an upstanding feeler slidably mounted on said platform, means for guiding said feeler for horizontal motion to and from the plane of said grooves, and means for indicating the distance of said feeler from the plane of said grooves.

3. A device of the class described comprising a platform having a work-receiving groove therein, a carriage above said platform having an opposing work-receiving groove above and parallel to the groove in the platform, means for guiding said carriage for vertical movement toward and from said platform, a fixed horizontal bar between and parallel to said grooves, an upstanding feeler slidable in said platform toward and from said bar, and means for indicating the horizontal distance of said feeler from said bar.

In testimony whereof I have affixed my signature.

WILLIAM B. MEGLITZ.